Patented Jan. 18, 1938

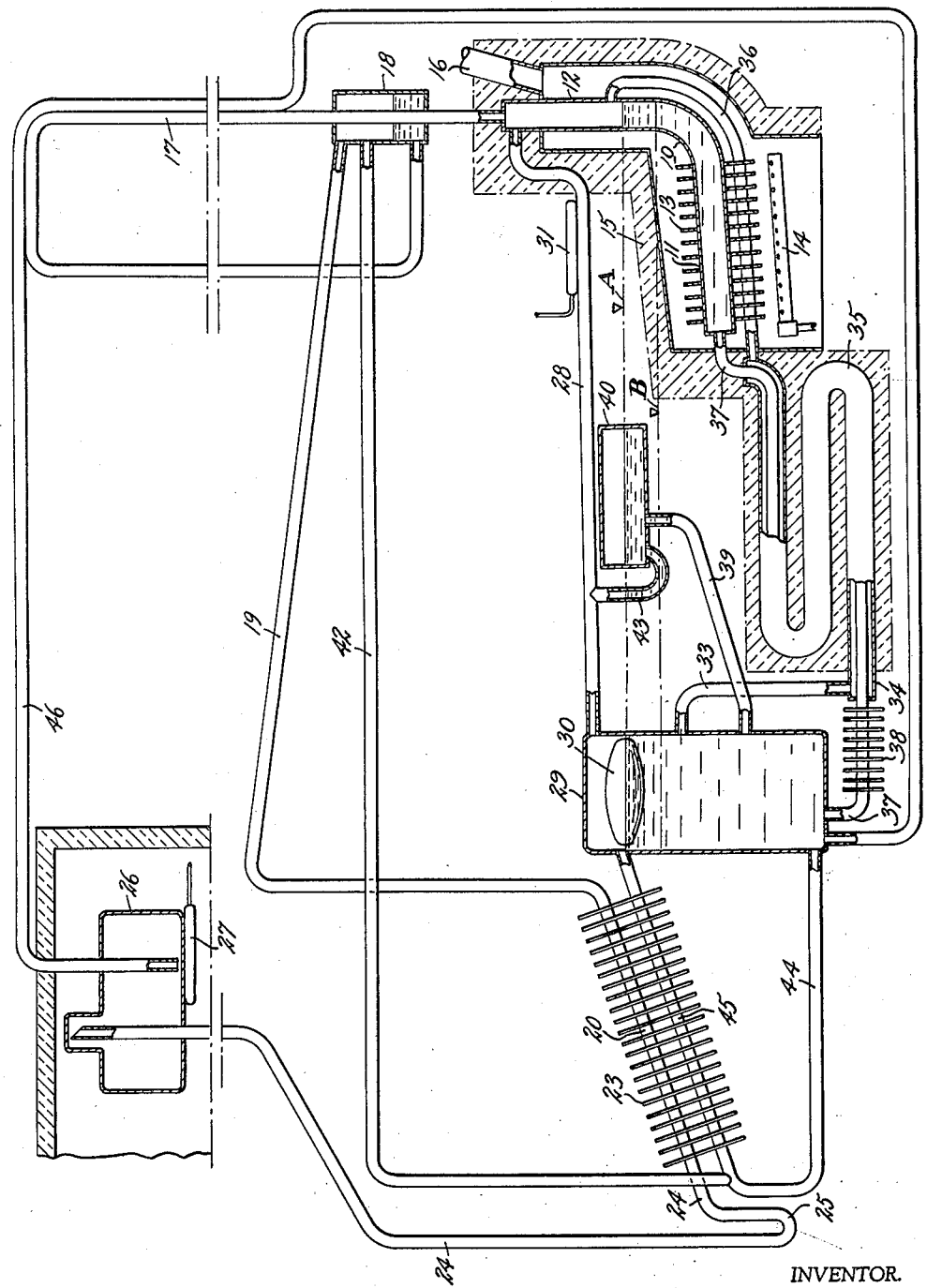

2,105,562

UNITED STATES PATENT OFFICE 2,105,562

REFRIGERATION

Albert R. Thomas, Evansville, Ind., assignor to Servel, Inc., New York, N. Y., a corporation of Delaware Application May 23, 1936, Serial No. 81,379

9 Claims. (Cl. 62—118)

My invention relates to refrigeration and more particularly to absorption type refrigerating systems in which a refrigeration cycle is performed in alternate periods.

An object of my invention is to provide a system of this type having a more rapid cycle operation.

Further objects and advantages of my invention will be apparent from the following description considered in connection with the accompanying drawing which forms a part of this specification and which is a more or less diagrammatic cross-sectional view of an apparatus in accordance with my invention.

Referring to the drawing, reference character 10 designates a generator including a substantially horizontal portion 11 and a stand pipe portion 12. Portion 11 is provided with heat transfer fins 13 and is arranged to be heated by any suitable means, such as the gas burner 14. Generator 10 is disposed within a heat insulated compartment 15 and products of combustion are discharged through the flue 16.

Connected to the upper end of stand pipe 12 is a conduit 17 which extends upwardly and thence downwardly in the form of a loop and communicates with the lower part of a liquid trap 18. A conduit 19 communicates with the upper part of trap 18 and with a condenser 20, the condenser being provided with heat radiating fins 23. A conduit 24 extends from the lower end of condenser 20, forms a liquid trap 25 and thence extends upwardly to the upper part of an evaporator 26. Evaporator 26 is disposed within a compartment to be cooled, such as the food storage space of a refrigerator cabinet.

A thermostatic element 27 is placed in heat exchange relation with evaporator 26 and serves to initiate a heating period, as will be explained later.

A conduit 28 establishes communication between the upper part of stand pipe 12 and a liquid storage vessel 29. A member 30 is adapted to float on the surface of the liquid within vessel 29 for the purpose of preventing to a great extent contact between the liquid and gas in the upper part of the chamber. A thermostatic element 31 is in heat exchange relation with conduit 28 and serves to terminate a heating period, as will be explained subsequently. A strong absorption liquid conduit 33 communicates with vessel 29 at a point preferably above the center of the chamber and extends downwardly to communicate with the outer conduit 34 of a liquid heat exchanger 35. A thermo-syphon conduit 36 communicates with the other end of outer conduit 34 and extends parallel to generator 10 and communicates with the stand pipe portion 12 of the generator. The thermo-syphon conduit is preferably in heat transfer relation with the fins 13 on the generator. A weak absorption liquid conduit 37 communicates with the lower end of the generator 10 and extends within the outer conduit 34 of the liquid heat exchanger 30. Conduit 37 may be provided with heat radiating fins 38 between the liquid heat exchanger 35 and vessel 29.

A conduit 39 communicates with vessel 29 at a point below the place where conduit 33 communicates therewith and extends to the bottom of a vessel 40. A conduit 43 in the form of a liquid trap extends from conduit 28 downwardly and thence upwardly to communicate with the bottom of vessel 40.

A conduit 44 communicates with the bottom of vessel 29 and extends upwardly in the form of an air cooled absorber 45 and communicates with the upper part of vessel 29. Absorber 45 may be in heat exchange relation with the fins 23 which serve to cool condenser 20. A conduit 42 extends from the upper part of trap 18 to the lower end of absorber 45.

A syphon drain conduit 46 communicates with the lower part of evaporator 26, extends upwardly and thence downwardly in heat exchange relation with a portion of conduit 17 and thence extends to the lower part of vessel 29. The portion of conduit 17 which is in heat exchange relation with the drain conduit 46 is spaced an appreciable distance from generator 10, whereby there is a lapse of time from the beginning of a heating period until heat is transmitted to the drain conduit.

The operation of the above described apparatus is as follows. The apparatus is charged with an absorption fluid, such as water and a refrigerant such as ammonia. When charged and before being heated, the liquid level in the apparatus stands at the point designated at A. The rest of the apparatus is filled with ammonia vapor and a small amount of water vapor.

Thermostat 27 is connected by well known means to a valve in the gas supply line to burner 14 and is operative to open this valve when the temperature of the element 27 is above a certain value, usually the maximum temperature desirable in the refrigerator. Assuming the temperature to be above this value, the flame of burner 14 heats the fluid within generator 10 and expels refrigerant from solution therein. This refrigerant passes upwardly through conduit 17 to the lower part of trap 18 and thence through conduit 19 to condenser 20. Conduits 17 and 19 are preferably exposed to the cooling effect of the atmosphere and hence act as a rectifier to condense water vapor which passes out of the generator with the refrigerant. Most of the water vapor so condensed drains into trap 18.

When the refrigerant vapor reaches a condenser 20 it is cooled by virtue of heat transmission from the fins 23 to the atmosphere and is liquefied, the liquid collecting in the trap 25. From this trap the liquid is forced upwardly through conduit 24 to evaporator 26. The increase in pressure in the system is able to lift this liquid to the evaporator and the liquid column of refrigerant in conduit 24 is balanced by a liquid column in conduit 46, which is the only other path to the evaporator.

The heating period continues, the liquid refrigerant collecting in the evaporator, until the absorption liquid level in the lower part of the apparatus has fallen to the point B. When this point is reached, the liquid within trap 43 will have been depressed below the bottom of the trap, whereby vapor is able to rush into vessel 40 through trap 43. This sudden rush of vapor from the generator through conduit 28 serves to heat thermostatic element 31, which is connected to the aforesaid valve in the gas supply line in such a manner as to operate the valve upon an increase in temperature, and thus terminate the heating period. There is at first a very rapid absorption of refrigerant gas in the liquid contained in vessel 40, thus rapidly reducing the pressure in the system and causing a more rapid cycle operation. This reduction of pressure is communicated to the evaporator by the conduits connected therewith and causes evaporation of the liquid refrigerant in the evaporator to commence. The vapor produced passes from the evaporator through conduit 24, condenser 20, conduit 19, trap 18 and conduit 42 to the lower end of absorber 45. The vapor forms bubbles within the absorber and acts as a liquid lift, thereby causing circulation of weak absorption liquid from the lower part of vessel 29 through conduit 44 and the absorber 45 to the upper part of vessel 29. While passing through the absorber the refrigerant vapor is absorbed in the weak absorption liquid and the heat of absorption is dissipated through fins 23. The absorption of the vapor in the liquid continues to reduce the pressure in the apparatus. This continues until all of the refrigerant within the evaporator has been evaporated. Thereafter, the interior of the refrigerator cabinet and hence the evaporator starts to warm up due to leakage of heat through the refrigerator walls or the opening of the refrigerator door and, when the temperature has reached a predetermined value, thermostatic element 27 acts to open the aforementioned valve in the gas supply line and another heating period is initiated.

After each evaporation period has been completed, there remains in the evaporator a small amount of water which has been carried over with the refrigerant and which does not evaporate with the refrigerant. If this water were not removed, it would accumulate with each cycle until a sufficient amount would be present in the evaporator to reduce the efficiency of the apparatus. In accordance with my invention, any water which has accumulated in the evaporator is removed at the beginning of each heating period by means of the syphon drain conduit 46. When the heating period starts, the pressure in the apparatus immediately increases and this increase in pressure is communicated through conduit 28 and vessel 29 to the lower end of conduit 46, and through conduit 17, trap 18, conduit 19, condenser 20, conduit 24 and evaporator 26 to the upper end of conduit 46. Consequently, liquid is forced upwardly from vessel 29 through conduit 46 and the liquid accumulated in the bottom of the evaporator 26 is likewise forced upwardly into conduit 46. The refrigerant vapor present in conduit 46 is thus trapped between the two rising columns of liquid and, due to the increase in pressure on this trapped vapor, the vapor is condensed to liquid and/or absorbed in the absorption liquid which is rising in the conduit. This condensation and absorption is aided by the fact that conduit 46 is cooled by the atmosphere. The result is that the drain conduit 46 becomes entirely filled with liquid and hence acts as a syphon to cause flow from the evaporator to vessel 29 at a lower level. If no means were provided to terminate this syphon action, liquid refrigerant introduced into the evaporator during the heating period would immediately be syphoned therefrom into vessel 29 and no refrigerant would be left in the evaporator for cooling purposes. In order to stop the syphon action, I place conduit 46 in heat exchange relation with a portion of conduit 17 which is remote from generator 10. Thus, after the heating period has been initiated for a short time, the hot vapor discharged from the generator through conduit 17 causes the contents of conduit 46 to be heated sufficiently so that refrigerant is vaporized therein, thus breaking the syphon. It is essential that the portion of conduit 17 which is in heat exchange relation with conduit 46 be remote from generator 10 so as to permit a lapse of time to take place after the heating period is first started before heat is transmitted to the contents of conduit 46. Otherwise, conduit 46 would be heated immediately upon the initiation of a heating period and the condensation of gas therein necessary to start the syphon action could never take place.

During the heating period strong absorption liquid flows from the upper part of vessel 29 through conduits 33 and 34 to thermo-syphon conduit 36. Here vapor is formed and acts to lift the liquid to stand pipe 12. More vapor is driven from the solution in generator 10 and weak absorption liquid flows therefrom through conduit 37 to the lower part of vessel 29. In passing through the liquid heat exchanger 35, the weak liquid transfers heat to the strong liquid, thus conserving heat. A further cooling of the weak liquid takes place by virtue of heat dissipation from fins 38. The thermo-syphon 36 maintains this circulation of absorption liquid during the heating period.

While I have shown and described one more or less specific embodiment of my invention, this has been done for purposes of illustration only and it is to be understood that my invention is not to be limited thereby, but only by the following claims when viewed in the light of the prior art.

What is claimed:

1. In an absorption refrigerating apparatus having alternate heating and refrigerating periods, a generator, a liquid storage chamber, a vapor conduit connecting the upper parts of said generator and said chamber, a vessel closed at the top, a conduit connecting the lower parts of said chamber and said vessel, and a conduit formed as a liquid trap connecting the vapor space of said chamber with the lower part of said vessel.

2. In an absorption refrigerating apparatus having alternate heating and refrigerating periods, a generator, a liquid storage chamber, a vapor conduit connecting the upper parts of said generator and said chamber, means in said chamber for reducing the area of contact between liquid and vapor, a vessel formed to provide a larger area of contact between liquid and vapor, a conduit connecting the lower parts of said chamber and said vessel, and a conduit formed as a liquid trap connecting the vapor space of said chamber with the lower part of said vessel.

3. In an absorption refrigerating apparatus, a generator, a liquid storage chamber, a vapor conduit connecting the upper parts of said generator and said chamber, means for heating said generator, a thermostatic element in heat exchange relationship with said conduit for controlling said heating means, a vessel closed at the top, a conduit connecting the lower parts of said chamber and said vessel, and a conduit formed as a liquid trap connecting the vapor space of said chamber with the lower part of said vessel.

4. In an absorption refrigerating apparatus, a generator, means for heating said generator, a vessel closed at the top, conduit means for connecting the lower part of said generator with the lower part of said vessel, conduit means for connecting the upper part of said generator with the lower part of said vessel, the last-mentioned conduit means including a liquid trap, and a thermostatic element in heat exchange relation with said last-mentioned conduit means for controlling said heating means.

5. In an absorption refrigerating apparatus, a generator, means for heating said generator, a vessel closed at the top, conduit means for connecting the lower part of said generator with the lower part of said vessel, conduit means for connecting the upper part of said generator with the lower part of said vessel, the last-mentioned conduit means including a liquid trap, and a thermostatic element in heat exchange relation with said last-mentioned conduit means for rendering said heating means ineffective to heat said generator upon an increase in temperature of said element.

6. An absorption refrigeration system in which a refrigeration cycle is performed in alternate periods of high and low pressures, a portion of said system being constructed and arranged to contain absorption liquid, and means to admit vaporous refrigerant into the presence of said liquid only upon occurrence of a predetermined condition in the system at the desired end of a high pressure period so that absorption of the vapor into the liquid produces a rapid decrease of pressure in the system.

7. An absorption refrigeration system in which a refrigeration cycle is performed in alternate periods of high and low pressures, a portion of said system being constructed and arranged to contain absorption liquid, means for supplying heat to said system, means to admit vaporous refrigerant into the presence of said liquid only upon occurrence of a predetermined condition in the system at the desired end of a high pressure period, and means to terminate operation of said heating means upon operation of said second means.

8. An absorption refrigeration system in which a refrigeration cycle is performed in alternate periods of high and low pressures, a portion of said system being constructed and arranged to contain absorption liquid, and means to admit vaporous refrigerant into the presence of said liquid only upon occurrence of a predetermined decrease of liquid level in another portion of the system at the desired end of a high pressure period so that absorption of the vapor into the liquid produces a rapid decrease of pressure in the system.

9. An absorption refrigeration system in which a refrigeration cycle is performed in alternate periods of high and low pressures, a portion of said system being constructed and arranged to contain absorption liquid, means for supplying heat to said system, means to admit vaporous refrigerant into the presence of said liquid only upon occurrence of a predetermined decrease of liquid level in another portion of the system at the desired end of a high pressure period, and means to terminate operation of said heating means upon operation of said second means.

ALBERT R. THOMAS.